3,166,517
CATALYST SYSTEM
Rolland S. Ro, Brandywine Hundred, Del., assignor to E. I. du Pont de Nemours and Company, Wilmington, Del., a corporation of Delaware
No Drawing. Filed Oct. 5, 1960, Ser. No. 60,579
4 Claims. (Cl. 252—429)

This invention relates to novel catalyst systems and more particularly catalyst systems for the polymerization of olefinically unsaturated compounds.

It is an object of the present invention to provide catalyst systems for the polymerization of olefinically unsaturated compounds. A further object is to provide novel catalyst systems consisting of vanadium tris(acetylacetonate), selected organoaluminum compounds and selected halogenated aliphatic hydrocarbons. Other objects will appear hereinafter.

These and other objects of this invention are accomplished by a catalyst system which is prepared by reacting (a) aluminum triisobutyl or diisobutylaluminum chloride or isobutylaluminum dichloride or the reaction product of 0.5–2 moles of aluminum chloride and 1 mole of aluminum triisobutyl, with (b) vanadium tris-(acetylacetonate), in the presence of carbon tetrachloride or trichloromonofluoromethane as the sole diluent for said catalyst system; the proportions of (a) and (b) being selected so that the value of the molar ratio of isobutyl radicals to vanadium atoms is at least 6:1, the vanadium concentration in said system being about 0.0001 molar to 0.1 molar.

The catalyst systems of the present invention are useful in the polymerization of olefinically unsaturated compounds. They may be employed for making homopolymers or copolymers of alpha monoolefins of the formula R—CH=CH$_2$ wherein R is hydrogen or an alkyl radical of not more than eight carbon atoms. Representative alpha monoolefins include ethylene; propylene; 1-butene; 1-hexane; 1-decene; 4-methyl-1-pentene; 1-heptene; 4-methyl-1-hexene; 5-methyl-1-hexene; 4,4-dimethyl-1-pentene; 6-methyl-1-heptene; 4-methyl-1-heptene; 5-methyl-1-heptene; 4,4-dimethyl-1-hexene; and 5,6,6-trimethyl-1-heptene. These systems may be used in the homopolymerization of certain substituted alpha monoolefins such as vinyl chloride, vinyl acetate and ethyl vinyl ether. They may also be used in the copolymerization of the above alpha monoolefins with non-conjugated hydrocarbon dienes. Representative dienes include dicyclopentadiene; an aliphatic diene having the structure

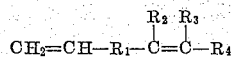

wherein R$_1$ is an alkylene radical, R$_2$ and R$_3$ are independently selected from the group consisting of hydrogen and alkyl radicals and R$_4$ is an alkyl radical and wherein R$_1$ to R$_4$ are so selected that the diene has from about 6 to 22 carbon atoms; a 5-alkenyl-substituted-2-norbornene 5-methylene-2-norbornene; and 2-alkly-2,5-norbornadienes.

Representative examples of aliphatic dienes, having the structure

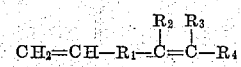

wherein the R's are as defined above, include 1,4-hexadiene, which is preferred; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Dienes such as 11-ethyl-1,11-tridecadiene are made by reacting an alkyl Grignard reagent with the alkyl ester of an ω-unsaturated carboxylic acid and dehydrating the tertiary alcohol thereby produced.

Examples of copolymers of these aliphatic dienes and the alpha monoolefins include ethylene/propylene/1,4-hexadiene, which is preferred;
ethylene/1 - butene/1,4 - hexadiene/11-ethyl-1,11-tridacadiene;
ethylene/1-butene/1-octene/6-methyl-1,5-heptadiene; and
ethylene/1-pentene/1,4-hexadiene/1,9-octadecadiene.

Another group of copolymers which may be prepared with the novel catalyst systems of this invention are those copolymers of at least one alpha monoolefin and dicyclopentadiene. Representative examples include ethylene/propylene/dicyclopentadiene, which is preferred;
ethylene/1-butene/dicyclopentadiene;
ethylene/propylene/1-butene/dicyclopentadiene;
ethylene/1-octene/dicyclopentadiene;
ethylene/propylene/1-hexene/dicyclopentadiene;
ethylene/1-heptene/1-decene/dicyclopentadiene; and
ethylene/5-methyl-1-heptene/dicyclopentadiene.

Still another group of copolymers which may be prepared with these novel catalyst systems are those copolymers of at least one alpha monoolefin and a 5-alkenyl-substituted-2-norbornene or 5-methylene-2-norbornene.

To obtain 5-methylene-2-norbornene, allene having the formula H$_2$C=C=CH$_2$ is heated in the absence of a polymerization initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of alpha monoolefins and 5-methylene-2-norbornene include ethylene/propylene/5-methylene-2-norbornene;
ethylene/1-butene/5-methylene-2-norbornene;

ethylene/1-decene/5-methylene-2-norbornene;
ethylene/5,5-dimethyl - 1 - octene/5 - methylene-2-norbornene;
ethylene/4-methyl-1-hexene/5-methylene-2-norbornene;
ethylene/4,4-dimethyl - 1 - pentene/5 - methylene-2-norbornene;
ethylene/5,6,6 - trimethyl - 1 - heptene/5 - methylene-2-norbornene.

The 5-alkenyl-2-norbornenes may be described by the following formula

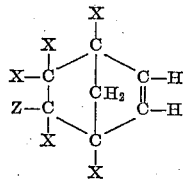

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

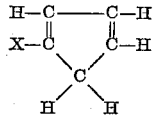

in which X is as heretofore described; the X's can be the same or different. The reaction is carried out at autogenous pressure in a closed inert (e.g., glass and stainless steel) container at temperatures ranging between about 150 to 250° C., preferably 175–225° C., for times ranging between about 2 to 24 hours. It is preferred that an addition polymerization inhibitor (e.g., hydroquinone) be present. Representative syntheses of this type are: the formation of 5-(2'-butenyl-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure X'—CH=CH—CH=CH—X", where X' and X" are alkyl radicals, can be used to prepare 4-alkyl-5-alkenyl-2-norbornenes having the structures

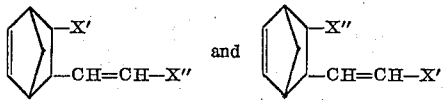

The reaction of cyclopentadiene with unsymmetrical nonconjugated dienes of the structure $$CH_2=CH—CH_2—CH=CH—Q$$

where Q is an alkyl radical will lead to 5-(2'-alkenyl)-2-norbornenes.

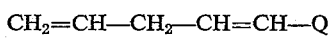

The reaction of cyclopentadiene with conjugated dienes of the formula $CH_2=CH—CH=CH—Q'$, where Q' is an alkyl radical, will produce

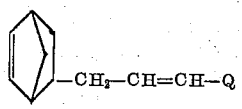

The 2-norborenes having the structures

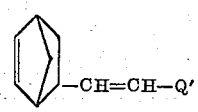

where Y is H or alkyl and Y' is alkyl, are made by reacting the Grignard reagent of 5-bromomethyl-2-norbornene in ether with ketones having the structure $$Y—CH_2—\overset{O}{\overset{\|}{C}}—CH_2—Y'$$

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5- 2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of copolymers of at least one alpha monoolefin and a 5-alkenyl-2-norbornene include
ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl)-2-norbornene;
ethylene/1-butene/5-(2'-butenyl)-2-norbornene;
ethylene/1-butene/5-(2'-ethyl-2'-butenyl)-2-norbornene;
ethylene/4,4-dimethyl-1-hexene/5-(2'-propyl-2'-pentenyl)-2-norbornene;
ethylene/5,5-dimethyl-1-octene/5-(2'-nonyl-2'-heptenyl)-2-norbornene;
ethylene/6-methyl-1-heptene/5-(2'-methyl-2'-decenyl)-2-norbornene;
ethyl/1-decene/5-(2'-hexyl-2'-butenyl)-2-norbornene; and
ethyl/5,6,6-trimethyl-1-heptene/5-(2'-octyl-2'-butenyl)-2-norbornene.

Still another group of copolymers which may be prepared with the catalyst systems of this invention are the copolymers of at least one alpha monoolefin and a 2-alkyl-substituted-2,5-norbornadiene. Representative examples include:

ethylene/propylene/2-methyl-2,5-norbornadiene;
ethylene/propylene/2-ethyl-2,5-norbornadiene;
ethylene/1-butene/2-methyl-2,5-norbornadiene;
ethylene/1-hexene/2-ethyl-2,5-norbornadiene;
ethylene/1-decene/2-butyl-2,5-norbornadiene; and
ethylene/1-heptene/2-octyl-2,5-norbornadiene.

The 2-alkyl-2,5-norbornadienes can be described by the following structural formula

where R is a $C_1$–$C_{17}$ alkyl radical. These dienes are made by heating acetylenes having the formula R—C≡C—H, where R is a $C_1$–$C_{17}$ alkyl radical, with cyclopentadiene at 175–225° C. in the absence of a polymerization initiator. Closed reaction vessels made from stainless steel or glass-lined steel are satisfactory.

The catalyst systems of the present invention are made by contacting vanadium tris(acetylacetonate) with selected organoaluminum compounds in the presence of selected liquid halogenated aliphatic hydrocarbons which serve as the reaction media when these catalyst systems are used to polymerize the above-described monomers. Either the aluminum compound or the vanadium compound can be contacted with a mixture of the other in the halogenated aliphatic hydrocarbon; alternatively, both compounds can be introduced simultaneously into the halogenated aliphatic hydrocarbon. In general, it is preferred to mix the catalyst components at a temperature of about 25° C. or lower. Catalyst stability depends on the temperature and the concentration of the aluminum and vanadium components in the liquid halogenated aliphatic hydrocarbon. The higher the temperature or the higher the concentration of the components, the more rapidly the catalyst system tends to lose its activity. In general, in the formation of the catalyst the pressure is not critical although when the catalyst is made in the presence of the monomers, particularly normally gaseous monomers such as ethylene or propylene, atmospheric or superatomospheric pressure may be preferred.

The organoaluminum compounds which are used in the catalyst systems of this invention are aluminum triisobutyl, diisobutylaluminum chloride, isobutylaluminum dichloride and the reaction product of 0.5 to 2.0 moles of aluminum chloride with 1 mole of aluminum triisobutyl. The useful halogenated hydrocarbons are carbon tetrachloride and trichloromonofluoromethane.

The proportions of the aluminum compound and the vanadium compound should be selected so that the value of the molar ratio of isobutyl groups to vanadium atoms is at least about 6:1. The catalyst activity decreases when the value is lower. The preferred proportions give values ranging from about 15:1 to 21:1. Proportions having higher values such as 30:1 are suitable.

Those skilled in the art can determine the concentrations of the aluminum and vanadium compounds which give the most convenient process and the polymer product best suited for a particular purpose. The vanadium concentration in the catalyst system should range from about 0.0001 to 0.1 molar, 0.0005 to 0.05 molar being preferred. The vanadium concentration preferably falls within 0.0001 to 0.1 molar when the vanadium and aluminum compounds are reacted in the halogenated aliphatic hydrocarbon. Alternatively, it is possible to use higher concentrations at the time the aluminum and vanadium compounds are reacted and subsequently dilute with an additional portion of the halogenated aliphatic hydrocarbon to form the catalyst system of the present invention. In like manner, one can react to the aluminum and vanadium compounds at high dilution in the halogenated aliphatic hydrocarbon and subsequently evaporate a sufficient amount of the hydrocarbon to raise the vanadium concentration to at least 0.0001 molar.

The catalyst systems of the present invention can be made in the presence or absence of the polymerizable monomers. In the former case, the vanadium and aluminum compounds can be simultaneously or sequentially added in a single portion or intermittently or continually to a mixture of part or all of the monomers in the halogenated aliphatic hydrocarbon. In the latter case a so-called "pre-mixed" catalyst is made. It may be stored in the absence of air, water, carbon dioxide, Zerewitinoff active hydrogen compounds, and the like at room temperature. In general, the duration of catalytic activity decreases as the temperature is raised.

The present catalyst systems are used by contacting them with the above-described monomers at atmospheric, subatmospheric or superatmospheric pressure. Atmospheric or superatmospheric pressure are preferred when a gaseous monomer such as ethylene is used. The above-described vanadium and aluminum compounds can be added to the halogenated hydrocarbon before, during or after the introduction of the monomers. When the process is operated at atmospheric pressure the preferred temperature ranges between about −15° C. and 15° C., at temperatures above 15° C. the yields tend to decrease, probably because of the decreased monomer solubility.

The polymerization is stopped by deactivating the catalyst with alcohol. The polymers formed are isolated by extracting the solution with aqueous mineral acid (e.g., 10% HCl) to remove vanadium and aluminum salts, washing the solution acid-free, and evaporating the solvent. A non-volatile antioxidant, such as 2,2′-methylenebis(6-tert-butyl-4-methylphenol) or 4,4′-thiobis(2-tert-butyl-5-methylphenol), is often incorporated prior to the final isolation step to avoid possible oxidation and degradation of the polymer.

In operating the polymerization process care should be taken to exclude all traces of moisture and oxygen since they tend to poison the catalyst systems. A protective atmosphere of an inert gas such as argon or nitrogen is often supplied prior to the introduction of the gaseous monomer feed stream. Monomer gases can be purified by passing them successively through columns of silica gel, scrubbers containing triisobutyl aluminum, and a column of silica gel connected to the inlet tube of the reaction vessel. The dienes and normally liquid alpha monoolefins (or selected substituted alpha monoolefins) can be purified by fractional distillation and passage through silica gel.

Any material is suitable for the reaction vessel which is inert to the reactants. Glass, glass-enamel, or stainless steel are satisfactory. The reactor should be equipped with means for agitation. For runs at atmospheric pressure it is preferred to use a monomer gas inlet tube having an opening below the liquid surface of the reaction mixture. The gas outlet tube should be protected from inflow of outside air by suitable straps.

In carrying out the polymerization process, the monomers are introduced, separately or in admixture, at a rate equal to or in excess of the rate at which polymer is formed. All of the monomers may be present before the run is started. Alternatively, part or all of the monomers may be added during the polymerization. This introduction may be continuous or periodic.

The polymers can be prepared by a continuous process at atmospheric or superatmospheric pressure. Thus, the halogenated aliphatic hydrocarbon, aluminum and vanadium compounds, and monomers may be introduced continuously into a polymerization zone at such a rate as to provide a residence time sufficient to build up the desired concentration of polymer in the polymerization mass. The residence time may vary widely, from, say, 10 minutes to several hours or more. In general, the residence time will be shorter as the concentrations of monomers and catalysts in the feed stream are increased. The polymer solution which continually overflows from the polymerization zone is contacted in a subsequent zone with a catalyst deactivator; the polymer is ultimately continually obtained after suitable continuous purification and isolation procedures similar to those described above.

The following examples will better illustrate the nature of the present invention; however, the invention is not intended to be limited to these examples. Parts are by weight unless otherwise indicated.

EXAMPLE 1

*A. Preparation of vanadium tris(acetylacetonate)*

Three grams of $VCl_3$ were dissolved in 10 milliliters of dilute sulfuric acid. The resulting solution was added to 20 milliliters of acetylacetone in an Erlenmeyer flask.

When this mixture was shaken, a reaction occurred and heat was evolved. Five minutes later the resulting dark brown solution was neutralized with aqueous sodium carbonate. The brown crystals which then precipitated were collected by filtration, washed with water and air-dried. Seven grams of vanadium tris(acetylacetonate) were obtained melting at 195–196° C. (after recrystallization from benzene and petroleum). *Analysis.*—Calc'd for $VC_{15}H_{21}O_6$: 14.4% V. Found: 14.6, 14.5% V.

B. *Preparation of ethylene/propylene copolymer*

The reaction flask was a one-liter glass resin flask equipped with a stirrer, a thermometer, a gas inlet tube, a gas outlet tube, and liquid inlet tube covered with a rubber (serum) cap. This apparatus was flame dried and allowed to cool under a stream of purified nitrogen which was maintained during subsequent operations until monomer gases were introduced. One liter of carbon tetrachloride at about 25° to 30° C. was filtered through a column of silica gel directly into the reaction flask. The filtered, rapidly stirred carbon tetrachloride was then sparged with the purified nitrogen for about 30 minutes. Then 0.35 gram (0.001 mole) of vanadium tris(acetylacetonate) and 1.3 milliliters (0.007 mole) of distilled diisobutylaluminum monochloride were introduced into the reactor (isobutyl:V molar ratio 14:1). A reddish-brown solution resulted which gradually became light brown.

Five minutes later, the nitrogen feed was stopped and a feed stream supplying ethylene and propylene at respective rates of 750 and 2250 cc./min. was introduced into the agitated catalyst solution by means of the gas inlet tube which projected below the liquid surface. The ethylene and propylene had been separately metered through flowmeters connected to separate purification trains where they passed successively through a column of silica gel, 3 columns each containing 20% solutions of aluminum triisobutyl in "Nujol" oil (a liquid petrolatum of specific gravity 0.88/0.90 at 60° F.), a column of "Nujol" oil, and a final silica gel column leading to a T-tube joining the streams. The nitrogen was purified by passage through a similar train.

For 30 minutes the reaction mixture was agitated at about 25° to 30° C. while monomer gases were introduced. Then 10 milliliters of n-butanol containing 0.1% by weight 4,4'-thiobis(2-tert-butyl-5-methylphenol) were introduced to deactivate the catalyst; the monomer feed stream was stopped. The copolymer was washed once with 10% hydrochloric acid, and twice with water. After drum drying, 29.5 grams of a soft rubbery copolymer were obtained containing 61% propylene units (by weight).

EXAMPLE 2

*Preparation of ethylene/propylene/1,4-hexadiene*

The procedure of Example 1B was repeated except: (a) 8 milliliters of 1,4-hexadiene were introduced into the reactor before the ethylene-propylene feed stream was started; (b) the solvent was removed by evaporation. A 21-gram yield was obtained of a rubbery ethylene/propylene/1,4-hexadiene copolymer having 0.67 gram-mole of diene units/kilogram and 42% propylene units by weight, and exhibiting an inherent viscosity (0.1% solution in tetrachloroethylene at 30° C.) of 0.82. The copolymer was sulfur-curable.

EXAMPLE 3

*Preparation of ethylene/propylene copolymer*

The copolymerization procedure of Example 1B was repeated except that: (a) trichloromonofluoromethane was substituted for carbon tetrachloride; (b) the reactor was equipped with a Dry Ice condenser and the polymerization mass kept at 0 to 10° C. with a Dry Ice-acetone bath. The copolymer formed remained in solution. It was isolated after deactivation of the catalyst with n-butanol [containing 0.1% by weight 4,4'-thiobis(2-tert-butyl-5-methylphenol)], by washing the solution once with 10% hydrochloric acid and then twice with water, separating the organic phase and allowing the trichloromonofluoromethane to evaporate. A yield of 43 grams of rubbery copolymer was obtained containing 70% propylene units by weight and exhibiting an inherent viscosity (0.1% solution in tetrachloroethylene) of 2.55.

EXAMPLE 4

*Preparation of ethylene/propylene/1,4-hexadiene copolymer*

The procedure of Example 2 was repeated except that: (a) 900 milliliters of trichloromonofluoromethane were substituted for the liter of carbon tetrachloride; (b) the reactor was fitted with an ice-water condenser and the polymerization mass kept at 5 to 15° C. with a Dry Ice-acetone bath. A 14.4-gram yield was obtained of a rubbery ethylene/propylene/1,4-hexadiene copolymer having about 0.8 gram-mole of diene units/kilogram and 38% propylene units by weight and exhibiting an inherent viscosity (0.1% solution in tetrachloroethylene at 30° C.) of 1.29. The copolymer was sulfur-curable.

EXAMPLE 5

*Polymerization of ethylene*

The homopolymerization of ethylene was carried out using the general procedure of Example 1B except that: (a) trichloromonofluoromethane was substituted for carbon tetrachloride; (b) the reaction was started at 5° C., the temperature rising gradually to 20° C. even though ice-water cooling was applied. The ethylene feed rate was 3 liters/min. After 10 milliliters of n-butanol [containing 0.1% by weight 4,4'-thiobis(2-tert-butyl-5-methylphenol)] had been added to stop the reaction, the small lumps of insoluble polyethylene were collected by filtration, washed with acetone and dried to give a yield of 23 grams of linear polyethylene with a molecular weight higher than 500,000 (melt index, no flow).

EXAMPLE 6

*Preparation of ethylene/propylene copolymer*

The general procedure of Example 1B was followed except that 1.25 milliliters (0.005 mole) of triisobutylaluminum was substituted for the 1.3 milliliters of diisobutylaluminum monochloride. The completely soluble premixed catalyst was light brown. After the copolymerization had been stopped by adding 10 milliliters of n-butanol [containing 0.1% by weight 4,4'-thiobis (2-tert-butyl-5-methylphenol)], the copolymer solution obtained was extracted once with 10% hydrochloric acid and twice with water. Drum drying of the organic phase gave 33.3 grams of a rubbery ethylene/propylene copolymer containing 62% propylene units by weight.

EXAMPLE 7

*Preparation of ethylene/propylene/1,4-hexadiene copolymer*

The procedure of Example 6 was followed except that 8 milliliters of 1,4-hexadiene were introduced after the premixed catalyst had aged 5 minutes. Eighteen grams of a rubbery ethylene/propylene/1,4-hexadiene copolymer were obtained containing 45% by weight propylene units and 0.61 gram-mole of diene units/kilogram of copolymer and exhibiting an inherent viscosity (0.1% solution in tetrachloroethylene at 30° C.) of 0.84. The copolymer was sulfur-curable.

EXAMPLE 8

*Preparation of ethylene/propylene/5-methylene norbornene copolymer*

The procedure of Example 6 was followed except that 1.1 milliliters (0.1 gram, 0.1 mole) of 5-methylene-2-norbornene were introduced after the catalyst had aged 5 minutes. Twenty-six grams of a rubbery ethylene/propylene/5-methylene-2-norbornene copolymer were obtained. The polymer was sulfur-curable.

EXAMPLE 9

*Preparation of ethylene/propylene copolymer*

The procedure of Example 6 was followed except that: (a) the reactor was kept at 10° C.; (b) trichloromonofluoromethane was substituted for carbon tetrachloride. The yield of soluble rubbery ethylene/propylene copolymer was 5.8 grams.

EXAMPLE 10

*Polymerization of ethylene*

Ethylene was homopolymerized according to the general procedure of Example 6. The ethylene feed rate was 3.3 liters/minute; the reactor was held at 25° C. During the 10-minute reaction period polyethylene continually separated from the reaction mixture in a fibrous mass which partially obstructed the gas inlet tube. After the catalyst had been deactivated with 10 milliliters of n-butanol, the polymer was collected by filtration, washed with acetone, and air dried. The yield was 9 grams; the polymer molecular weight was higher than 500,000 (melt index: no flow).

EXAMPLE 11

*Polymerization of propylene*

Propylene (fed at 2.25 liters/min.) was homopolymerized according to the general procedure of Example 6. A yield of 4.1 grams of tacky product was obtained.

EXAMPLE 12

*Polymerization of vinyl chloride*

Vinyl chloride (fed at 2.6 liters/min.) was homopolymerized acocrding to the procedure of Example 6. The vinyl chloride was passed through a silica gel tower before entering the reaction vessel. After the catalyst had been deactivated with 10 milliliters of n-butanol [containing 0.1% by weight 4,4'-thiobis(2-tert-butyl-5-methylphenol)], the turbid reaction mixture was successively washed with 10% hydrochloric acid and water in a separatory funnel; after the organic layer had been separated and evaporated to dryness, 4.5 grams of polyvinyl chloride were obtained.

EXAMPLE 13

*Polymerization of ethyl vinyl ether*

Ethyl vinyl ether was homopolymerized using the procedure of Example 6 except that: (a) only 500 milliliters of carbon tetrachloride were used; (b) the temperature during the reaction was allowed to rise from 25° C. to 40° C. The reaction was started by addition of 50 milliliters of freshly distilled monomer to the reactor 5 minutes after the preparation of the catalyst. After the catalyst had been deactivated, the reaction mixture was washed with water, n-butanol was added to break the emulsion which formed, the organic phase was separated and concentrated by evaporation to give 40 grams of a balsam-like material.

EXAMPLE 14

*Preparation of ethylene/propylene/1,4-hexadiene copolymer*

The equipment used is described above in Example 1B.

In turn, 0.35 gram (0.001 mole) of vanadium tris(acetylacetonate) and 1.3 milliliters (0.005 mole) of triisobutylaluminum were injected into one liter of agitated nitrogen sparged carbon tetrachloride at 0° C. After 5 minutes, 10 milliliters (0.074 mole) of 1,4-hexadiene were injected. The nitrogen was shut off and a feed stream was introduced supplying a gaseous mixture of ethylene (750 cc./min.) and propylene (1,500 cc./min.). For 30 minutes the reaction mixture was agitated at 0 to 2° C. Then 10 milliliters of n-butanol [containing 0.1% by weight 4,4'-thiobis(2-tert-methylphenol)] were added to the viscous solution to deactivate the catalyst. The monomer feed was shut off and the carbon tetrachloride was washed, in turn, with 10% hydrochloric acid and water, and evaporated by drum drying to give 21 grams of copolymer exhibiting an inherent viscosity of 2.53 and containing 36% propylene units by weight and 0.65 mole diene units/kg.

As many widely different embodiments of this invention may be made without departing from the spirit and scope thereof, it is to be understood that this invention is not limited to the specific embodiments thereof except as defined in the appended claims.

What is claimed is:

1. A catalyst system prepared by reacting, in the presence of a halogenated hydrocarbon selected from the group consisting of carbon tetrachloride and trichloromonofluoromethane as the sole diluent for said system, (a) an organoaluminum compound selected from the group consisting of aluminum triisobutyl, diisobutylaluminum chloride, isobutylaluminum dichloride and the reaction product of 0.5 to 2.0 moles of aluminum chloride with 1.0 mole of aluminum triisobutyl, with (b) vanadium tris(acetylacetonate), the proportions of (a) and (b) being selected so that the value of the molar ratio of isobutyl radicals to vanadium atoms is at least 6:1, the vanadium concentration in said system being about 0.0001 to 0.1 molar.

2. A catalyst system according to claim 1 wherein the organoaluminum compound is diisobutylaluminum chloride.

3. A catalyst system according to claim 1 wherein the organoaluminum compound is the reaction product of 1.0 mole of aluminum triisobutyl with 0.5 mole of aluminum chloride.

4. A catalyst system according to claim 1 wherein the vanadium concentration ranges from about 0.005 to 0.05 molar.

References Cited in the file of this patent

UNITED STATES PATENTS

| 2,913,446 | Cull et al. | Nov. 17, 1959 |
| 2,954,367 | Vandenberg | Sept. 27, 1960 |
| 2,962,451 | Schreyer | Nov. 29, 1960 |
| 3,058,963 | Vandenberg | Oct. 16, 1962 |